Dec. 26, 1939.  B. F. GREGORIC  2,184,384
PNEUMATIC LOADER
Filed Sept. 9, 1937
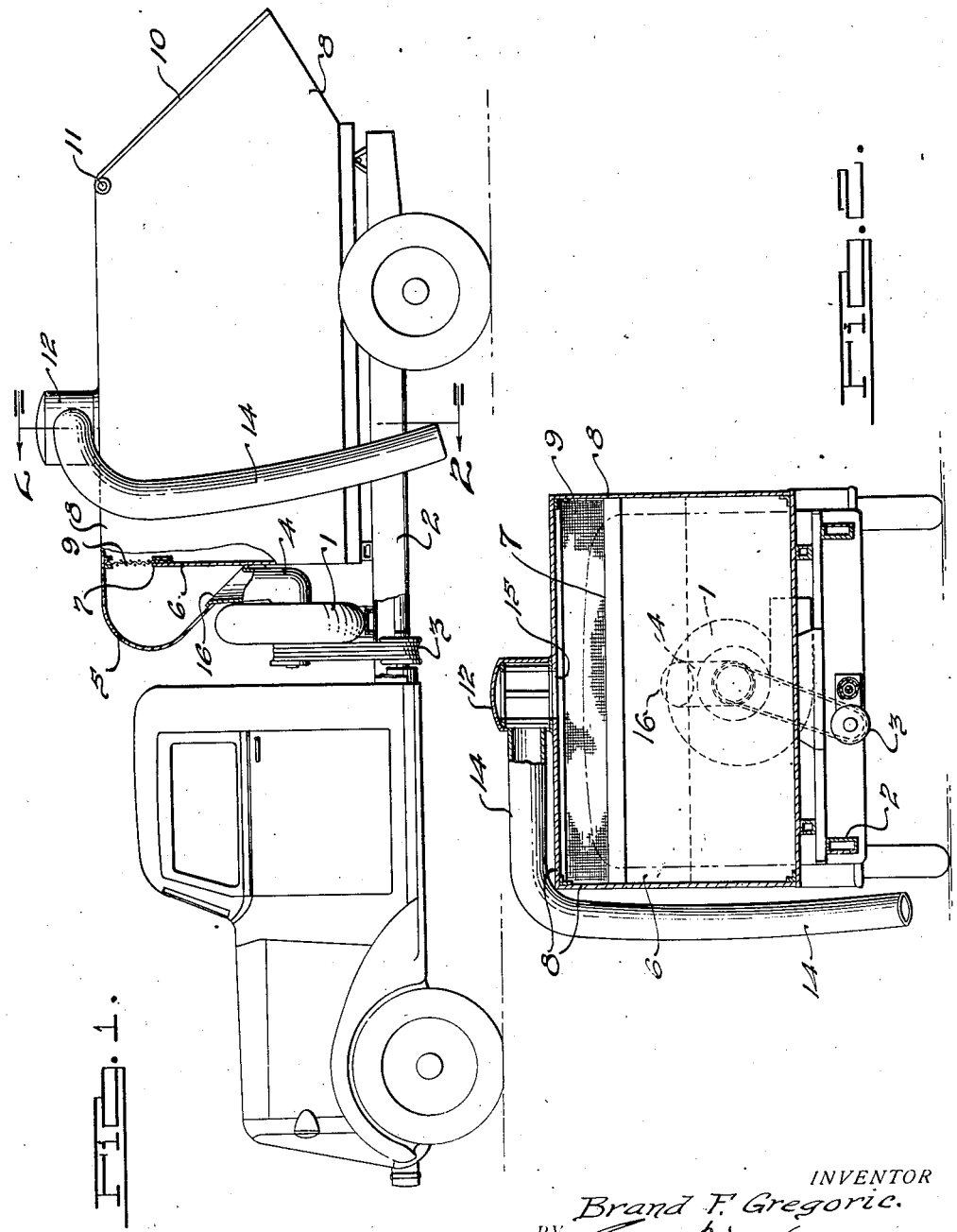
INVENTOR
Brand F. Gregoric.
BY
ATTORNEY Patented Dec. 26, 1939

2,184,384

UNITED STATES PATENT OFFICE 2,184,384

PNEUMATIC LOADER

Brand F. Gregoric, Detroit, Mich., assignor to Pneumatic Truck Body Corporation, Detroit, Mich., a corporation of Michigan Application September 9, 1937, Serial No. 163,113

2 Claims. (Cl. 302—17)

This invention relates to pneumatic loaders and the object of the invention is to provide a pneumatically operated means for loading a truck body.

One of the particular objects of the invention is to provide a truck body having a revolving turret at the top to which the loading hose is attached and having air exhaust means arranged to withdraw the air from the body so that the body acts as a settling compartment for the material drawn in through the loading hose.

Another object of the invention is to provide a truck body having a screened compartment at the forward end to which the exhaust fan or exhaust pump is connected and arranged to draw a partial vacuum within a truck body so that the loading hose will deliver the material into the truck body and the exhaust fan or pump will withdraw the air from the truck body and allow the material to settle within the body.

Another object of the invention is to provide an exhaust chamber at the forward end of the truck body provided with a partition terminating below the top of the truck body and a screen extending upwardly from the partition whereby the air is withdrawn from the top of the truck body and the material is screened out of the air before passing to the suction fan or pump.

These objects and the several novel features of the invention are hereinafter more fully described and claimed and the preferred form of construction by which these objects are attained is shown in the accompanying drawing in which—

Fig. 1 is an elevation of a truck and body equipped with my pneumatic loader and showing the exhaust compartment in section.

Fig. 2 is a section taken on line 2—2 of Fig. 1.

As shown in Fig. 1, an exhaust fan or pump 1 is mounted on the truck chassis 2 and the truck is equipped with a power take-off 3 for driving the exhaust fan or pump. This exhaust fan or pump is provided with an intake pipe 4 which connects to the exhaust compartment 5 on the truck body. This exhaust compartment 5 is built out from the truck body as shown and a partition 6 is provided between the exhaust compartment and the truck body. The partition 6 terminates at a point 7 below the top of the truck body 8 and a screen 9 is provided between the top of the partition 6 and the top of the truck body.

The truck body proper is formed of sheet metal and is enclosed on all sides. At the rear, the truck body is provided with a tail gate 10 which is hinged at 11 and which may be opened to allow removal of the contents of the body. On the top of the body a rotatable turret 12 is provided and a suction hose 14 is connected to the rotatable turret 12 so that the hose 14 may be moved around to any desired position to pick up the material to be loaded. This rotatable turret as shown in Fig. 2 is provided with an opening 15 directly into the interior of the truck body.

In operation, the exhaust fan or pump is driven by the power take-off and, as it is driven, will produce a partial vacuum in the exhaust chamber 5 and in the truck body. The only air which can enter the truck body to satisfy the requirements of the exhaust pump or fan must enter through the pick up hose 14 which is preferably a flexible hose. Thus, when this hose is inserted in the material to be loaded the material is drawn through the hose and through the turret 12 and through the opening 15 into the truck body.

The truck body acts as a settling compartment for the material and the air is taken out of the truck body at the forward end through the opening above the partition 6 and through the screen 9 which prevents the material from passing to the blower or pump. By shielding the air exhaust opening 16 by means of the partition 6 the air is caused to take a circuitous path before passing to the exhaust pump so that the material is readily separated from the air. After the truck body has been loaded, the power take-off may be disconnected allowing the truck to be driven in the usual manner, and by means of the hinged tail gate 10 the material may be unloaded from the truck. This may be accomplished by means of a dump mechanism (not here shown) which may be used to tilt the body and dump the material or the truck may be unloaded in any other desired manner by opening the tail gate 10.

From the foregoing description it becomes evident that the device is very simple and efficient in operation, will not easily get out of order, will easily and efficiently load a truck body by pneumatic means and provides a device which accomplishes the objects described.

Having thus fully described my invention, its utility and mode of operation, what I claim and desire to secure by Letters Patent of the United States is—

1. In a pneumatic loader for a closed automobile dump truck body, an extension formed on the forward end of the truck body providing an exhaust chamber, the bottom of the extension sloping downwardly toward the truck body, a partition separating the extension from the truck body and terminating below the top of the truck body, a screen between the top of the partition and the top of the truck body, an exhaust conduit opening through the sloping bottom wall of the extension, air exhaust means connected to the exhaust conduit, the arrangement allowing reduction of pressure within the truck body, a rotary turret mounted on top of the truck body, a pick up conduit connected to the rotary turret and arranged to discharge through the rotary turret into the truck body and a tail gate on the end of the dump truck body normally acting as a closure for the truck body but allowing removal of material therefrom when opened.

2. In a pneumatic loader for a closed automobile truck body, a rotatable turret mounted on top of the truck body, a pick up conduit secured to the rotatable turret, an exhaust chamber extending from the truck body, a partition separating the exhaust chamber from the truck body and providing an opening between the top of the partition and the top of the truck body, a screen closing the said opening, an exhaust pump mounted on the truck chassis, means for driving the exhaust pump from the truck engine and a conduit opening from the intake side of the exhaust pump and opening into the exhaust chamber below the top of the partition.

BRAND F. GREGORIC.